Jan. 1, 1952
P. H. FOSTER
2,581,091
CONTINUOUS LINE SEISMOMETER
Filed Oct. 21, 1950
2 SHEETS—SHEET 2
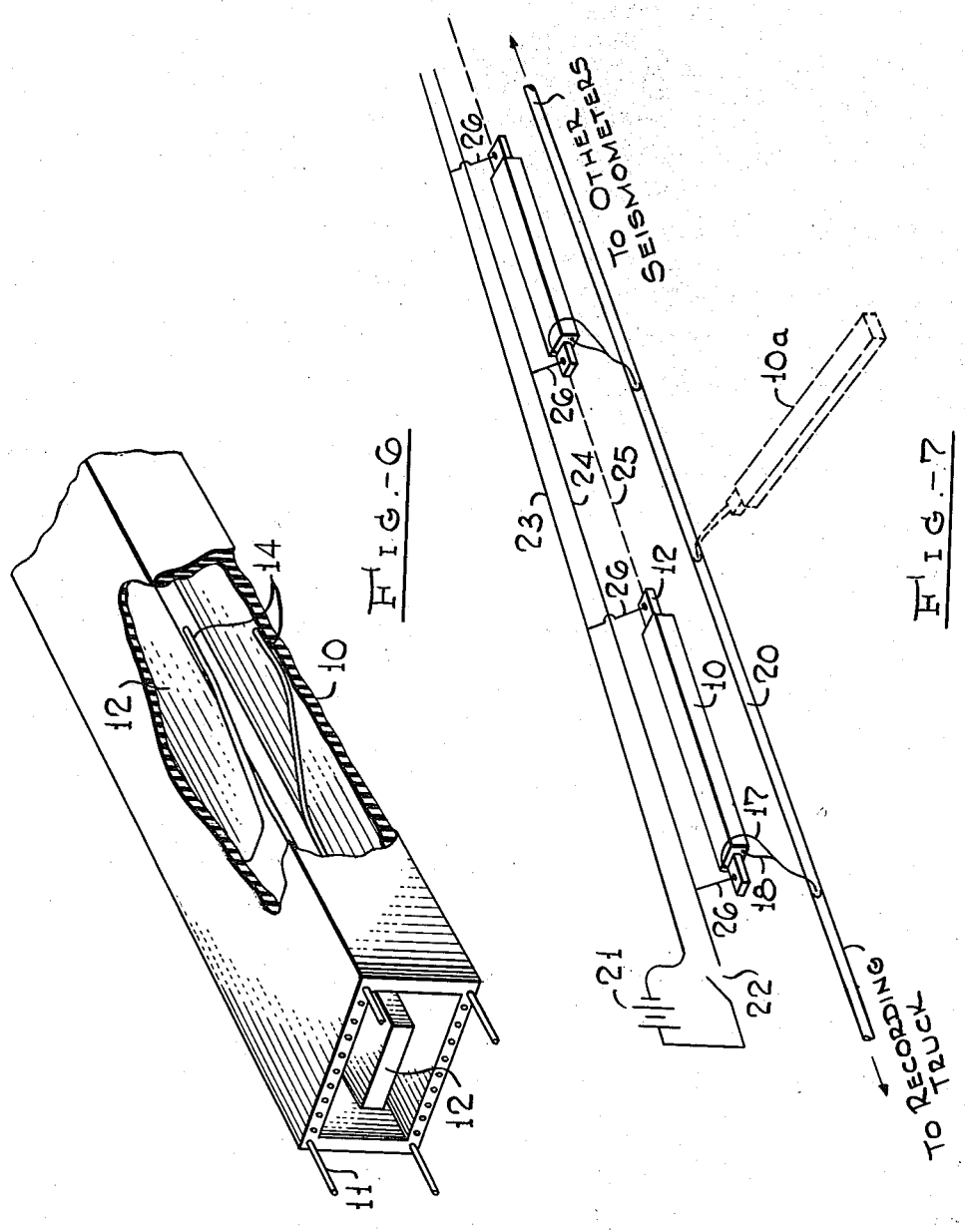
Paul H. Foster Inventor
By W. O. J. Heilman Attorney Patented Jan. 1, 1952

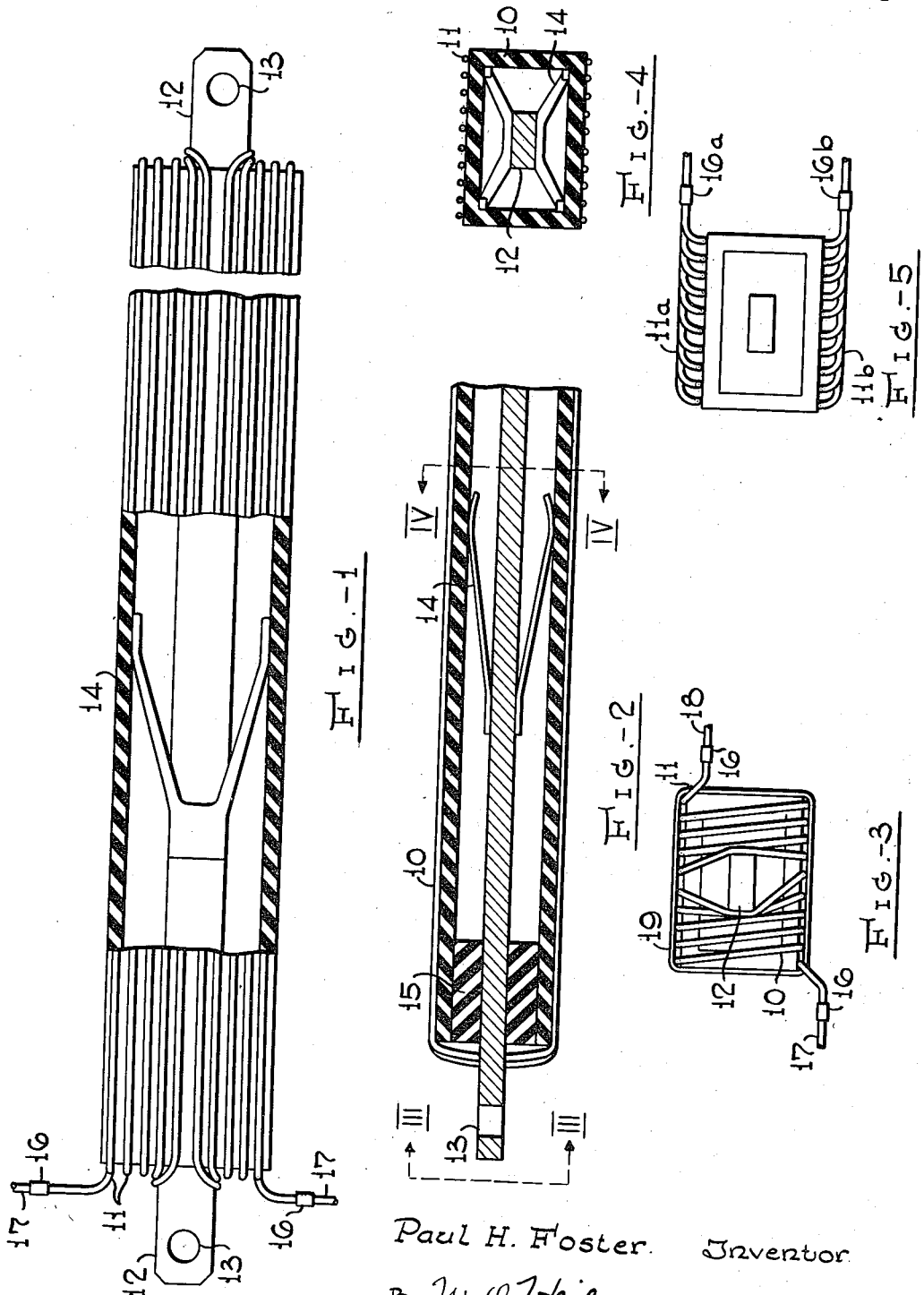

2,581,091

UNITED STATES PATENT OFFICE 2,581,091

CONTINUOUS LINE SEISMOMETER

Paul H. Foster, Tulsa, Okla., assignor to Standard Oil Development Company, a corporation of Delaware Application October 21, 1950, Serial No. 191,427

5 Claims. (Cl. 177—352)

This invention is concerned with an improved type of portable seismometer, also referred to as a geophone, for seismic prospecting. More particularly the invention relates to a seismometer which is equivalent to an infinite number of conventional type geophones distributed along a continuous line. This improved device depends for its operation upon the setting up of a detectable current or voltage in a number of parallel conductors, lying in the magnetic field surrounding a separate elongated conductor carrying an electrical current, upon the receipt of seismic vibrations that cause minute changes in the spacing of the parallel conductors relative to the separate elongated conductor, as will be more fully described hereinafter.

A method commonly employed for prospecting for oil or for other mineral deposits is that known as seismic prospecting wherein the depth and probable nature of underlying substrata are ascertained by initiating a seismic shock at a selected point at or near the earth's surface, the resulting motion of the earth from seismic waves initiated by the seismic disturbance being detected at a number of points in the earth's surface by means of sensitive pickups, known as geophones or seismometers, which translate the detected wave motion into electrical impulses which after suitable amplification can be recorded on a seismograph. Usually the seismic disturbance is produced by detonation of an explosive shot placed on the ground, in a shot hole, or above the surface of the ground and adjacent thereto. It is common practice to place the geophones in line with the shot point and to space them more or less evenly from each other and from the shot point. A suitable multiconductor cable is provided through which the individual geophones can be connected to a recording station, usually a field truck, provided with seismograph instruments. Conventionally, a seismograph record is obtained by means of a number of moving coil galvanometers each one of which has a mirror attached thereto, the mirrors being arranged in such relation to a source of light and a moving strip of sensitized paper or film that there will be recorded on the paper or film a plurality of wave forms or traces representative of the seismic waves that have been picked up by the individual geophones, suitably amplified, and fed to the galvanometers. The strip of paper or film is moved longitudinally at a substantially constant speed and is provided by well known means with suitable timing marks so that when the seismograph record or seismogram is later examined it is possible to determine the length of time required for the arrival of seismic waves at any particular point on the earth's surface either directly from the source or by reflection from underlying strata. From other data obtained in the area being studied, such as seismic wave velocities in the various earth layers, it is then possible to estimate the depths of the various reflecting substrata.

The making of seismograph records in the manner above referred to is of value in that it gives information regarding the nature of the earth's subsurface, based on the principle that part of the energy of the artificial seismic shock will travel downwardly and be reflected back toward the surface by various more or less well-defined substrata, and that this reflected energy will be detected by the geophones and be recorded on the seismograph record. Hence, the desirability of placing on one record the traces of as many geophone locations as is practical, since a reflection from a well-defined substratum will appear on the record as a wave form of increased amplitude on all of the traces in some definite time relation, permitting the reflection to be "lined up" on the record.

In order to increase the effectiveness of the records it has become frequent practice to employ a plurality of geophones at each station, all tied to one trace on the record. This practice has many advantages, including the cancelling out of near-surface anomalies. For example, if only a single geophone is used and it happens to be placed near a buried stump or boulder, an anomalous travel time may be obtained for seismic waves reaching that geophone, whereas if 30 or 50 geophones are laid out and all tied to the same trace, anomalous signals will be cancelled out and the reflected wave will be picked up by the majority of the geophones. Also, if a plurality of geophones are laid out in the direction of the line of spread of the geophone stations and several geophones are tied to the same trace, the group of geophones will act as a directional receiver since signals that are not lined up will tend to cancel out, whereas nearly plane wave fronts, representing reflections from substrata, will arrive at all of the geophones at substantially the same time. Furthermore a plurality of geophones tied together in this manner will aid in discriminating against disturbing background noise, generally referred to as "wind noise" and "ground unrest"; thus resulting in improved presentation of the reflected signal. A further result will be that weaker reflected signals will be discernable, or conversely, smaller initiating explosive charges may be employed to give equal efficiency in detecting reflecting layers.

It is evident that although the use of a plurality of geophones at each station produces many advantages, the practice does add to the time and labor involved for the making of each record, as well as to the investment cost. It is accordingly one object of the present invention to provide a single geophone which will replace such a plurality of geophones at each station. Another object is to provide a single instrument which will in effect act as an infinite number of geophones placed side by side. It is a further object of the invention to provide a seismometer capable of picking up an integrated signal representative of a true reflected wave front of seismic energy and to reject or cancel out spurious signals.

The nature and objects of the invention and the manner in which it is to be performed will be readily apparent from the ensuing description and from the accompanying drawing in which:

Fig. 1 is a top view, with portions shown in section, of one embodiment of the invention;

Fig. 2 is a sectional side view of a portion of the embodiment shown in Fig. 1;

Fig. 3 is an end view looking in the direction of line III—III of Fig. 2;

Fig. 4 is a sectional view taken along the line IV—IV of Fig. 2;

Fig. 5 is an end view similar to Fig. 3 but showing an alternate arrangement for connecting the parallel conductors;

Fig. 6 is a perspective view, partly in section, of another embodiment of the invention; and Fig. 7 is a schematic diagram showing two alternate methods for laying out spreads of seismometers in practising this invention.

Referring now to Figures 1 and 2 which are top and side views respectively of one embodiment of the invention, it will be seen that the supporting body of the seismometer consists of an elongate sheath or tubing of more or less rectangular cross section. This sheath may be constructed of any suitable flexible elastic material, such as rubber, which will return to its original shape after being distorted. Supported by sheath 10 is a wire 11 which is wound lengthwise of the sheath in the form of an elongated coil. This coil may be simply cemented to the outside of the sheath or otherwise attached to it by any convenient method as, for example, by taping it with a plastic tape 19 as shown in Fig. 3. Alternatively the coil may be embedded in the sheath as shown in Fig. 6. Preferably wire 11 should be multi-strand flexible wire or cable to ensure that it will withstand stresses encountered during handling of the seismometer. Centrally disposed within sheath 10 is an elongated conductor 12 preferably of copper which may be either solid or woven wire depending on the conditions under which the seismometer will be used, the overall length of the device, vibrational frequency desired, and the like.

Central conductor 12 must be capable of carrying a direct current of considerable magnitude, for example of the order of 10 to 25 amperes. Fastened to conductor 12 at suitably spaced intervals are a plurality of springs 14 which elastically support conductor 12 in the center of sheath 10 in such a manner that when the device is in contact with the earth and a seismic disturbance reaches the device, sheath 10 and the attached coil of wire 11 will be displaced with respect to conductor 12. Thus if a direct current of sufficient magnitude is flowing through central conductor 12, this displacement will cause the coil to cut the lines of force in the magnetic field surrounding the central conductor and induce a voltage in coil 11. The resultant voltage may then be recorded by conventional seismic recording equipment. The arrangement of springs 14 within the tubing 10 is also shown in Fig. 4 which is a sectional view taken along line IV—IV of Fig. 2.

At each end of the sheath 10 a spacer plug 15 is inserted to support the ends of the central conductor 12. Holes 13 may be provided at each end of conductor 12 for convenience in attaching battery or generator leads for furnishing the required current for the central conductor. Connector clips 16 are supplied at each end of coil 11 to facilitate attaching suitable leads 17 and 18 for connecting the seismometer to seismic recording equipment through the usual cable.

In place of a single continuous coil of wire which will furnish a voltage output type of seismometer it may in some instances be desirable to provide for a current output type of seismometer. One arrangement that may be employed is depicted in Figure 5 which is an end view similar to that of Fig. 3 but which shows a top layer of parallel wires 11a tied to a single connector clip 16a and a bottom layer of parallel wires 11b connected to a second connector clip 16b. At the opposite end of the seismometer all of the wires 11a will be connected to all of the wires 11b. It will be seen that this arrangement provides for connecting the individual parallel conductors in parallel whereas the arrangement of Figures 1, 2 and 3 provides for connection of the individual parallel conductors in series.

An embodiment of the invention in which the parallel wires are embedded in the sheath 10 is shown in Fig. 6, which is a perspective view of a section of the device with a portion of the wall of the sheath 10 cut away.

The natural vibrational frequency of the device should preferably be in the desirable range of about 4 to about 40 cycles per second, which may be attained by a selection of the proper thickness and flexibility of sheath 10 and conductors 11 and 12 and by use of springs 14 of proper characteristics.

The seismometer may be of any desired length, e. g., from 5 to 100 feet or more and ordinarily will be about 10 to 50 feet in length. However, the length could also be equal to or greater than the normal distance between seismometer stations, in order to obtain the effect of an infinite number of seismometers laid side by side over the entire pickup spread.

As a practical example the seismometer could be made 15 feet long using 100 turns of No. 33 wire in coil comprising wires 11, the distance from the center of conductor 12 to the parallel wires 11 being of the order of $\frac{3}{16}$" to $\frac{1}{4}$". With a current through conductor 12 of 10 amperes, a seismic wave imparting an earth particle velocity of 0.005 cm./sec. would generate a signal of 20 microvolts in the seismometer.

In Figure 7 is shown diagrammatically one method of laying out the seismometers of this invention so that they will parallel the spread of geophone stations. The leads 17 and 18 are tied into cable 20 which is connected to suitable seismic recording equipment in a recording truck. The current for the central conductor 12 of each geophone is provided by feeder lines 23 and 24 which receive the required current from power source 21. The latter may be a storage battery or a direct current generator, for example: A switch 22 is provided in the feeder line, since current need be fed to the central conductors only during the few seconds required for the making of a seismic record.

In some instances it may be advantageous to arrange the seismometers perpendicular to the spread, as shown by the dashed outline 10a in Fig. 7. Also, instead of feeding the current to central conductors 12 in parallel as shown, it may be desired to connect the central conductors in series, in which case tie lines 25 would be used and return line 24 and all but the first and last tie lines 26 would not be necessary. In either arrangement feeder lines 23 and 24 are maintained in a sufficiently remote position from the seismometers so that their induced magnetic field will not affect the field of the seismometers.

It is to be understood that other embodiments than those depicted are contemplated within the scope of this invention. For example by placing conductors 11 and 12 in parallel vertical planes rather than in parallel horizontal planes as has been illustrated, a seismometer primarily sensitive to horizontal disturbances rather than vertical displacements will result.

Also instead of employing a sheath 10 of generally rectangular cross section a sheath of somewhat flat oval shape could be used, the wires 11 being supported by the bottom and top walls of the oval. Such a modification is, of course, obvious, and therefore need not be specifically illustrated.

It is to be understood that the specific embodiments of the invention depicted in the foregoing description are by way of example only and are not intended to limit the scope of the invention, the same being limited only by the following claims.

What is claimed is:

1. Improved portable seismometer of the continuous line type comprising an elongated elastic flexible tubular supporting member, a plurality of elongated parallel conductors supported by the walls of said supporting member, a central elongated conductor elastically supported longitudinally of said supporting member, means for introducing a direct current into said central conductor and means for collecting an induced current from said plurality of parallel conductors.

2. Improved portable seismometer of the continuous line type comprising an elongated elastic tube of substantially rectangular cross section, a first plurality of conductors held in parallel relation by one wall of said tube lengthwise thereof, a second plurality of conductors held in similar longitudinal relation by an opposite wall of said tube, a single elongated conductor elastically supported by said tube in the center thereof, means for introducing an electrical current into said single conductor and means for collecting an induced current from all of said first and second pluralities of parallel conductors.

3. Seismometer according to claim 2 in which said central conductor is elastically supported by spring members placed at spaced intervals within said tube.

4. Seismometer according to claim 2 in which said parallel conductors supported by one wall of said tube and said parallel conductors supported by second wall are tied together in series to form a single continuous coil about said tube.

5. Seismometer according to claim 2 in which said conductors held by one wall of said tube are tied together in parallel, said conductors held by said second wall are tied together in parallel and said two sets of conductors are tied together in series.

PAUL H. FOSTER.

REFERENCES CITED

The following references are of record in the file of this patent:

UNITED STATES PATENTS

| Number | Name | Date |
| --- | --- | --- |
| 2,410,805 | Black | Nov. 12, 1946 |
| 2,440,803 | Massa | May 4, 1948 |
| 2,521,136 | Thuras | Sept. 5, 1950 |